(12) United States Patent
Comin

(10) Patent No.: US 12,483,339 B2
(45) Date of Patent: Nov. 25, 2025

(54) PHOTON SOURCE AND METHOD FOR QUANTUM COMMUNICATION

(71) Applicant: Airbus SAS, Blagnac (FR)

(72) Inventor: Alberto Comin, Blagnac (FR)

(73) Assignee: Airbus SAS, Blagnac (FR)

( * ) Notice: Subject to any disclaimer, the term of this patent is extended or adjusted under 35 U.S.C. 154(b) by 241 days.

(21) Appl. No.: 18/480,107

(22) Filed: Oct. 3, 2023

(65) Prior Publication Data

US 2024/0121011 A1 Apr. 11, 2024

(30) Foreign Application Priority Data

Oct. 6, 2022 (EP) ..................................... 22199971

(51) Int. Cl.
| | |
|---|---|
| *H04B 10/00* | (2013.01) |
| *G02B 6/42* | (2006.01) |
| *H04B 10/70* | (2013.01) |
| *H04J 14/00* | (2006.01) |

(52) U.S. Cl.
CPC ............ *H04B 10/70* (2013.01); *G02B 6/4206* (2013.01)

(58) Field of Classification Search
CPC ...................................................... H04B 10/70
See application file for complete search history.

(56) References Cited

U.S. PATENT DOCUMENTS

| | | | | |
|---|---|---|---|---|
| 2020/0118026 A1* | 4/2020 | Ashrafi | ....................... | G02F 3/00 |
| 2021/0133614 A1 | 5/2021 | Ashrafi | | |
| 2021/0325605 A1* | 10/2021 | Rudolph | ................... | G02F 3/00 |

OTHER PUBLICATIONS

European Search Report for corresponding European Patent Application No. 22199971.7 dated Mar. 14, 2023; priority document.

Chen Yu et al., "Orbital Angular Momentum Multiplexing for Free-Space Quantum Key Distribution Impaired by Turbulence" 2018 14th International Wireless Communications & Mobile Computing Conference, Jun. 25, 2018; pp. 636-641.

Mayron Y, Lizcano Saavedra et al., "Desing of Phase Masks for Implementing in an Orbital Angular Momentum Multiplexing/Demultiplexing System in Free Space" 2017 IEEE Colombian Conference on Communications and Computing, Aug. 16, 2017; pp. 1-6.

I. Cristiani et al., "Roadmap on Multimode Photonics" Journal of Optics, published Jul. 11, 2022.

* cited by examiner

*Primary Examiner* — Daniel G Dobson
(74) *Attorney, Agent, or Firm* — Greer, Burns & Crain Ltd.

(57) ABSTRACT

A photon source for quantum communication including a plurality of optical channels, each comprising: a light emitter configured to emit optical pulses, and a phase mask optically connected to the respective light emitter and configured to encode an orbital angular momentum into incident light, wherein each of the phase masks of each optical channel is configured to encode a mutually orthogonal orbital angular momentum to the optical pulses emitted by the light emitter of each optical channel to provide an encoded optical output; a controller electrically coupled to each light emitter in each optical channel and configured to control parameters of the optical pulses; and combining optics configured to combine the encoded optical output of each of the optical channels to form a single encoded optical signal.

20 Claims, 5 Drawing Sheets

PHOTON SOURCE AND METHOD FOR QUANTUM COMMUNICATION

CROSS-REFERENCES TO RELATED APPLICATIONS

This application claims the benefit of the European patent application No. 22199971.7 filed on Oct. 6, 2022, the entire disclosures of which are incorporated herein by way of reference.

FIELD OF THE INVENTION

The invention relates to a photon source for quantum communication as well as to a method for quantum communication. The invention is furthermore concerned with an optical quantum communication system.

Typical quantum communication systems using quantum cryptographic key-distribution use the polarization of the light in order to encode information into single photons. Recently, systems have been developed using the orbital angular momentum to encode information into the light. Due to the degrees of freedom, this allows high-dimensional encoding and can be achieved using a programmable spatial light modulator. The document Ilaria Cristiani et al, "Roadmap on multimode photonics" 2022 J. Opt. 24, 083001 summarizes the state of the art in this field.

BACKGROUND OF THE INVENTION

For these systems, there is a need to transmit more information per time, i.e., to provide a higher data rate.

According to a first aspect of the invention, a photon source for quantum communication is provided. The photon source comprises a plurality of optical channels, each comprising: a light emitter configured to emit optical pulses, and a phase mask optically connected to the respective light emitter and configured to encode an orbital angular momentum into incident light, wherein each of the phase masks of each optical channel is configured to encode a mutually orthogonal orbital angular momentum to the optical pulses emitted by the light emitter of each optical channel to provide an encoded optical output; a controller electrically coupled to each light emitter in each optical channel and configured to control parameters of the optical pulses; and combining optics configured to combine the encoded optical output of each of the optical channels to form a single encoded optical signal.

According to a second aspect of the invention, an optical quantum communication system comprising a photon source according to the invention is provided.

According to a third aspect of the invention, a method for quantum communication is provided. The method comprises the steps of providing a photon source comprising: a plurality of optical channels comprising at least one light emitter configured to emit optical pulses, and a phase mask optically connected to the respective light emitter and configured to encode an orbital angular momentum into incident light, wherein on activation of the light emitter each optical channel provides encoded optical pulses, wherein the encoded optical pulses of each of the optical channels are encoded by a mutually orthogonal orbital angular momentum; and combining optics combining the encoded optical pulses of each of the optical channels to form a single encoded optical signal; and forming the single encoded optical signal by activating simultaneously only one optical channel for each of the encoded optical pulses of the encoded optical output of each optical channel; or forming a multiplexed encoded optical signal as the encoded optical signal by activating simultaneously at least two optical channels and combining the encoded optical pulses of each of the activated optical channels.

SUMMARY OF THE INVENTION

A fundamental concept of the invention is to provide separate light channels each providing a separate encoded signal, which is distinguishable from the other signal of the other channels. Each light channel thus includes a light emitter and a particular phase mask so that each output provides a mutually orthogonal encoded output or mutually orthogonal modes that are distinguishable from the output of the other optical channel.

As an encoding scheme, the present invention utilizes the orbital angular momentum of the photon. The advantage of that kind of encoding is a high order and high-dimensional encoding, thus achieving a relatively high encoding density in comparison to classical quantum encoding schemes such as, e.g., polarization. The basic idea is to use different laser sources for each value of the orbital angular momentum that one needs to produce for a specific quantum key distribution (QKD) protocol.

A particular advantage in the solution according to an aspect of the invention is that the source can encode high dimensional quantum information (qudits) in the photons using the orbital angular momentum of the light. The same source can also be used to encode standard qubits and multiplex the photons using the orbital angular momentum. A further advantage is that it is possible to use cheap and small light sources as emitters, which can also be precisely controlled using high speed electronics. These could include, for example, laser diodes, VCSELs, DFB-laser diode or quantum dots. Using such sources, it is possible to produce on-demand optical pulses with pulse duration of about 100 ps and repetition rates of 100 MHz and more. It is further possible to produce any arbitrary pattern (e.g., on-off-on-off-off-off-on) by using common equipment such as a Field Programmable Gate Arrays (FPGA). In this sense, activation of the light emitter simply means that the light emitter is switched on so that it can emit light as described above.

The phase mask thus converts the incident light emitted from the light emitter to a mode, which carries an orbital optical momentum, such as $l=-2, -1, 1, 2, \ldots$. The phase mask thus enables higher order and multi-dimensional encoding. Such phase masks may be realized, e.g., by phase plates having vortex distribution or by trench waveguides.

The present photon source can also be operated by entangled photons. This is possible, e.g., by using an emission from a single atom, e.g., in a quantum dot, configured to emit a sequence of entangled photons by setting up a cluster state. The operation with entangled photons is combinable with a high-order and high-dimensional encoding. Using entangled photons enables an improvement of the security of the communication link.

A further advantage is that the photon source is capable of producing a high-frequency stream of photons. Using the same scheme of switching on and off the VCSELs, a modulation speed at a repetition rate of 100 MHz, 250 MHz, 500 MHz or 1 GHz is possible to obtain.

In order to encode light, two modes of operation of the photon source are possible: According to the first operation mode, only one emitter is switched on at a certain time in a clock cycle, and using the orbital angular momentum to encode information into each photon. According to the second mode, more than one light emitter may be switched on so that the output of the light channels of the respective emitters are grouped together in such a way to realize a multiplexed laser signal. For example, each group of 4 channels could be used to encode bidimensional qubits (similar to the 3384 protocol). Then in each clock cycle, one turns on a single emitter from each group. The groups are then multiplexed together before leaving the source.

The combined light channel can then be used as it is and fed into another waveguide or fiber, or it can be coupled to free space using a fiber collimator or another mean (e.g., a diffraction grating). The whole source could be made very compact (several centimeters or smaller) because most components can be implemented using waveguides or photonic chips. With respect to other solutions based on, e.g., liquid crystal modulator, the invention can be much faster, because it can use static devices to encode the orbital angular momentum, therefore avoiding the need of trying to modulate the spatial phase directly, which is difficult to do in a very fast way.

The invention also relates to an optical quantum communication system comprising the inventive photon source. Such a quantum communication system may further comprise an optical receiver configured to receive and decode the encoded optical signal, wherein the photon source emitting qudits and the receiver are configured to receive and decode the qudits, e.g., by using similar beam-splitting optics, phase masks and photo-detectors. The system may thus use a high-dimensional QKD protocol.

As within this application, it should be understood that the term "light" or "optical" refer to electromagnetic waves in the optical spectrum, wherein the optical spectrum covers the range UV-light (including deep UV, i.e., wavelength from about ~1 nm) to the Far-Infrared band (Wavelength up to about 100 lam). Advantageous embodiments and further developments emerge from the description with reference to the figures.

According to some aspects of the photon source according to the invention, the light emitter is a single photon source, which, in particular, is configured to have a photon emission probability of equal or less than 1 photon per pulse. Each optical pulse thus contains in average less than 1 photon, so as to be useful for quantum communication applications. For this purpose a CPU and/or an FPGA can be used to generate the electrical current pulses which drive the light emitters at specific times. The light emitter can be a "true" single photon source, which emits single photons deterministically following a trigger signal, e.g., sent by the FPGA. Such a light emitter is particularly useful for quantum communication. Alternatively, in a preferred range, the emission probability of the light emitter is in the range of 0.1 and 0.5 photons per pulse. This range reduces the probability of multiple photon emission in the same cycle and is thus also particularly suitable for quantum communication.

According to some further aspects of the photon source according to the invention, the light emitter is configured as a laser diode and configured to emit a spatially single light mode. Preferably, the laser diode is configured as a Vertical-Cavity-Surface-Emitting Laser (VCSEL). Alternatively or in addition, a quantum dot a DFB-laser diode, or another type of laser diode with a spatial filter may be used to achieve single mode optical output. Preferably, the beam profile follows a Gaussian profile. Such a spatially single light is clean and free from distortions and may be used, e.g., to efficiently couple into a single mode fiber or waveguide.

According to some further aspects of the photon source according to the invention, the light emitter is configured to emit ultrashort optical pulses. These optical pulses are driven by electric signals sent by the controller. The pulse width, i.e., pulse duration or pulse length, of the emitted optical pulses, or laser pulses, can have any possible length from, e.g., 1 fs to >1 ms. However, preferably the optical pulses have a pulse width in the range of 1 ps to 1000 ps. In a more preferred range, the pulse width of the optical pulses is in the range of 50 ps to 200 ps, for example 100 ps. This allows a high-speed clock cycle of the photon source and the further communication channel, thus a high-speed data rate of up to 1 GHz and more.

According to some further aspects of the photon source according to the invention, each optical channel includes coupling optics for coupling the emitted optical pulses into a fiber or waveguide, wherein for each optical channel the fiber is optically connected to the phase mask. The fiber may be any kind of optical waveguide. It may be a classical optical fiber used in telecommunications. Such a fiber or waveguide is characterized by a core that is surrounded by a cladding having a lower refractive index than the refractive index of the core thus enabling guiding by total reflection at their interface. The fiber waveguide used here may thus also be a two-dimensional waveguide, e.g., a waveguide structured on a chip.

The coupling optics is used to couple the emitted light into the fiber or waveguide. For this, it may comprise a microlens, having a spherical or aspherical surface. The waveguide or fiber may be a single mode fiber or waveguide. This allows having a very compact optical channel, providing reliable encoded optical output. Alternatively, it may be a multi-mode fiber, few-mode fiber, polarization-maintaining fiber, ring or vortex fiber or hollow-core fiber.

According to some further aspects of the photon source according to the invention, each optical channel includes an electric feedback circuit comprising at least one photodetector, wherein the feedback circuit is configured to detect a part of the light of the emitted optical pulses and provide a corresponding electrical signal to the controller. With this circuit, it is possible to monitor the emitted light of the light emitter by detecting the emitted photons. A photodetector provides a photo current proportional to the emitted photons that might be sent directly to the controller, or being converted into a proportional voltage before being sent to the controller. The controller may use this signal to adapt the drive current of the light emitter in order to achieve a desired optical output and/or photon emission probability.

According to some further aspect, the feedback circuit is configured to detect a current of the light emitter. The driving current is a current, which flows in the light emitter. In this way, it is possible to measure the real current driving the light emitter. This measured current could be different from the nominal current value due to, e.g., thermal effects. The measured current is sent as a feedback to the controller to adjust the driving current for the light emitter. In this way, the photon emission and the emission probability can be controlled with higher accuracy.

According to some further aspects of the photon source according to the invention, the combining optics is configured as a fiber-based optical setup. Fiber-based should be understood as any waveguide-based structure characterized by a guide core and a surrounding cladding having a lower refractive index than the core. The fiber-based structure could be classical optical fibers or on-chip waveguides that comprise a plurality of optical fibers. These fibers are multimode optical fibers and configured to guide light carrying an orbital momentum. The fiber-based coupling optics also comprises at least one fiber coupler configured to couple light carrying an optical orbital momentum. These multimode optical fibers and the coupler/s are configured to substantially maintain the encoded optical pulses, so that a qudit coupled to the fiber is maintained during its propagation. Each of the plurality of fibers is optically connected to an optical channel. The at least one multimode fiber coupler is configured to combine at least two encoded optical pulses to form a multiplexed encoded optical pulse. With this structure, a compact and robust coupling, e.g., with respect to vibrations, of the optical channel's encoded optical output is possible. Furthermore, the encoded output signal may be directly coupled into further fibers for transmission to a receiver. The fiber-based coupling optics thus provides a compact, versatile and reliable photon source.

According to some further aspects of the photon source according to the invention, the orbital momentum carrying fibers comprise at least one of the following: a multi-mode fiber, a few-mode fiber, a multi-mode core fiber, a few-mode multi-core fiber, a ring core fiber, a vortex fiber, an air-core optical fiber. These fibers or waveguides are capable to carry and maintain the encoded orbital angular momentum, thus the encoded information of the optical output.

According to some further aspects of the photon source according to the invention, the optical channel and/or the combining optics is configured as an on-chip element. This can be achieved by suitable material compositions, e.g., including silicon or other semiconductors, that allow to dispose suitable waveguide structures onto a chip. This structure results in a particularly compact optical channels and/or coupling optics, thus a very compact photon source.

According to some further aspects of the photon source according to the invention, the phase mask and/or the combining optics comprise free-space optical elements. As an alternative, or as a redundant setup in addition to a fiber-based structure, this aspect may be realized using basic optical elements. The combining optics may, e.g., comprise a beam combiner, polarization dependent or independent, wave-plates (e.g., half- or quarter waveplates) or polarizers (e.g., bulk- or thin-film polarizer). This allows a controlling of the light when propagating through the optical channels and the coupling optics.

According to some further aspects of the photon source according to the invention, the controller is configured to control at least one of: an emission time, an amplitude, a pulse width, a delay time, an emission frequency, and a pulse shape of each of the optical pulses. This can be achieved by a suitable electrical signal generator in or connected to the controller, the controller then sends a corresponding drive current or signal to the light emitter. These parameters allow precise control of the optical pulses and thus the encoded signal, enabling reliable quantum communication with a high data rate.

According to some further aspects of the photon source according to the invention, the controller is configured to control the photon emission probability of each light emitter. This allows defining different levels of emission probability and avoids two-photon emissions in one clock cycle. This enables quantum communication using decoy states, which renders photon splitting attacks to be impossible. This aspect thus improves the security of the communication link.

According to some further aspects of the photon source according to the invention, the controller comprises a central control unit and, for each optical channel an electric circuit, wherein each electric circuit is configured to control at least one parameter of the light emitter of the respective optical channel. Using such a controller or electronics, each light emitter of each light channel may be controlled separately. It thus may be switched on or off individually in one clock cycle, enabling flexible use of the photon source for communication purposes.

According to some further aspects of the photon source according to the invention, the phase mask is configured to encode high dimensional quantum information (qudits). This allows a high information density that leads to a high data rate.

According to some further aspects of the photon source according to the invention, the photon source may comprise a fiber collimator to output a collimated encoded light beam into free space. Alternatively or in addition, the photon source may also comprise a free space collimator optical element to collimate the encoded optical signal. This allows an encoded optical signal to have no or only a few divergence so that it can be transmitted over free space to a distant receiver. Such a transmission may include building-to-building, land-to-ship, ground-to-air (e.g., ground to an air-plane or UAV), ground-to-space (e.g., base station-to-satellite), or space-to-space (e.g., inter-satellites) transmission links. Alternatively, the encoded optical signal may be coupled and transmitted over optical fiber to a receiver.

BRIEF DESCRIPTION OF THE DRAWINGS

The present invention is explained more specifically below on the basis of the exemplary embodiments indicated in the schematic figures, in which.

DETAILED DESCRIPTION OF THE PREFERRED EMBODIMENTS

Figure 1:
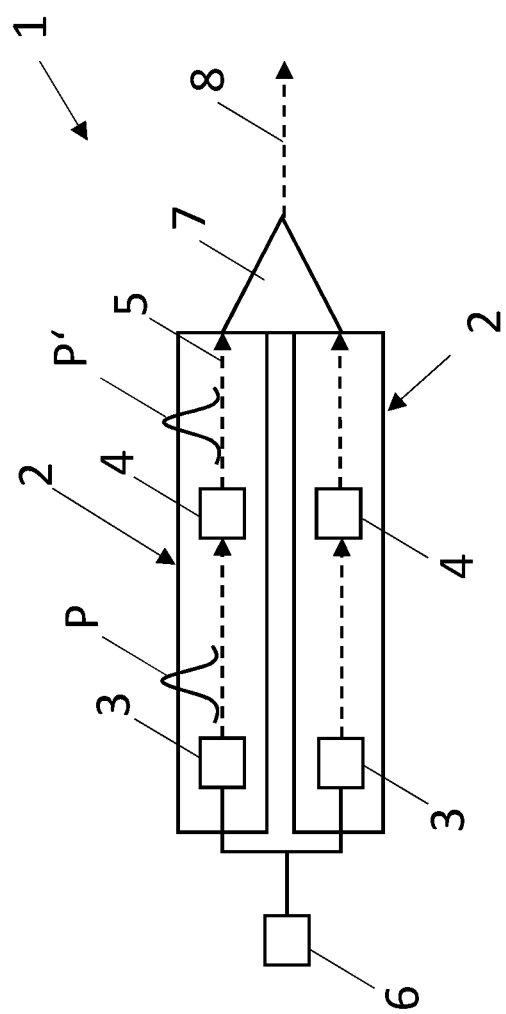
FIG. 1 shows a schematic illustration of a photon source for quantum communication comprising two optical channels according to an embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

FIG. 1 shows a schematic illustration of a photon source 1 for quantum communication according to an embodiment of the invention;

The photon source 1 for quantum communication comprises a plurality of optical channels 2. The photon source 1 of the embodiment in FIG. 1 comprises two optical channels 2 that are arranged parallel to each other. This parallel orientation, however, is not mandatory.

Figure 2:
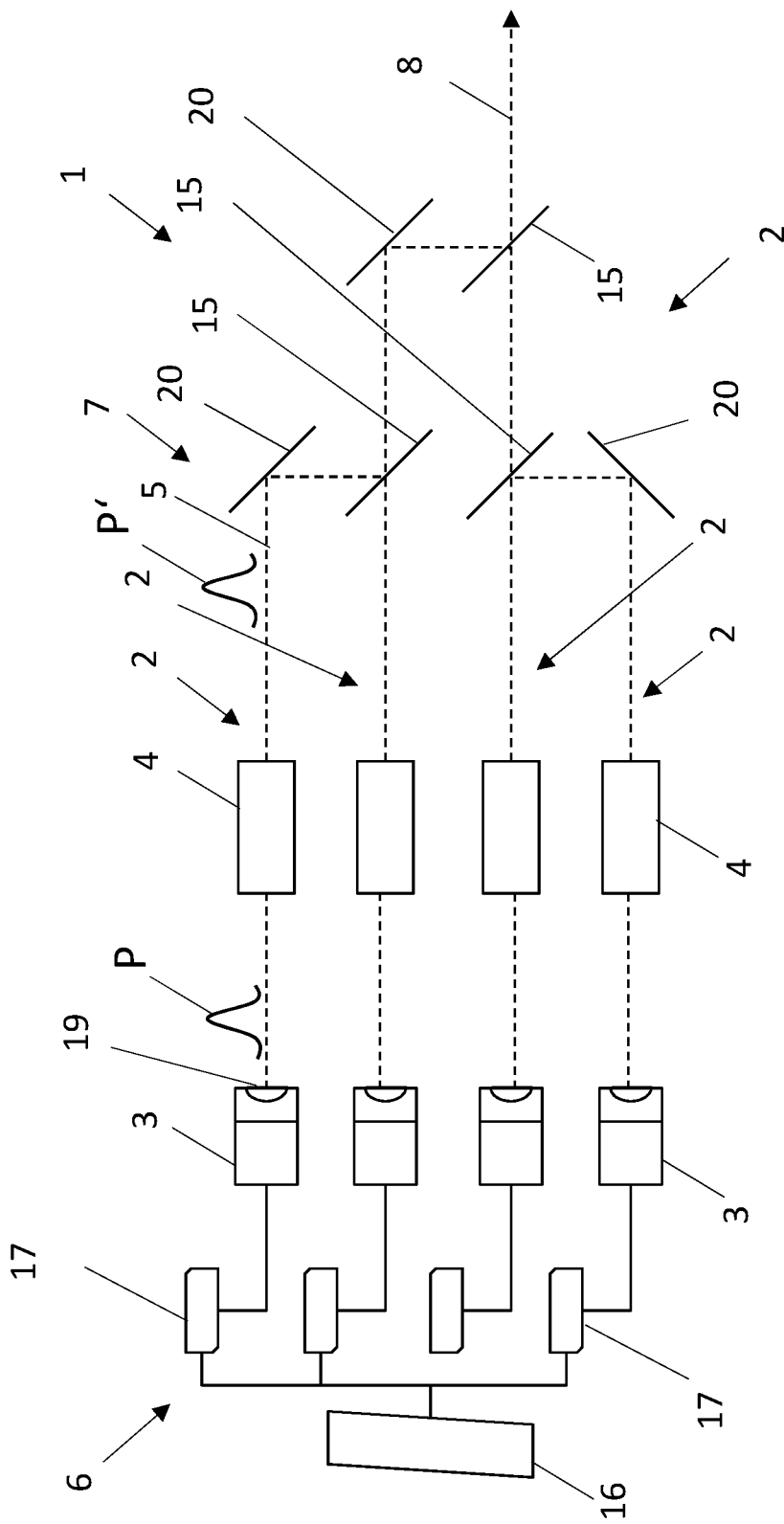
FIG. 2 shows a schematic illustration of a photon source for quantum communication comprising four optical channels according to a further embodiment of the invention.
Figure 3:
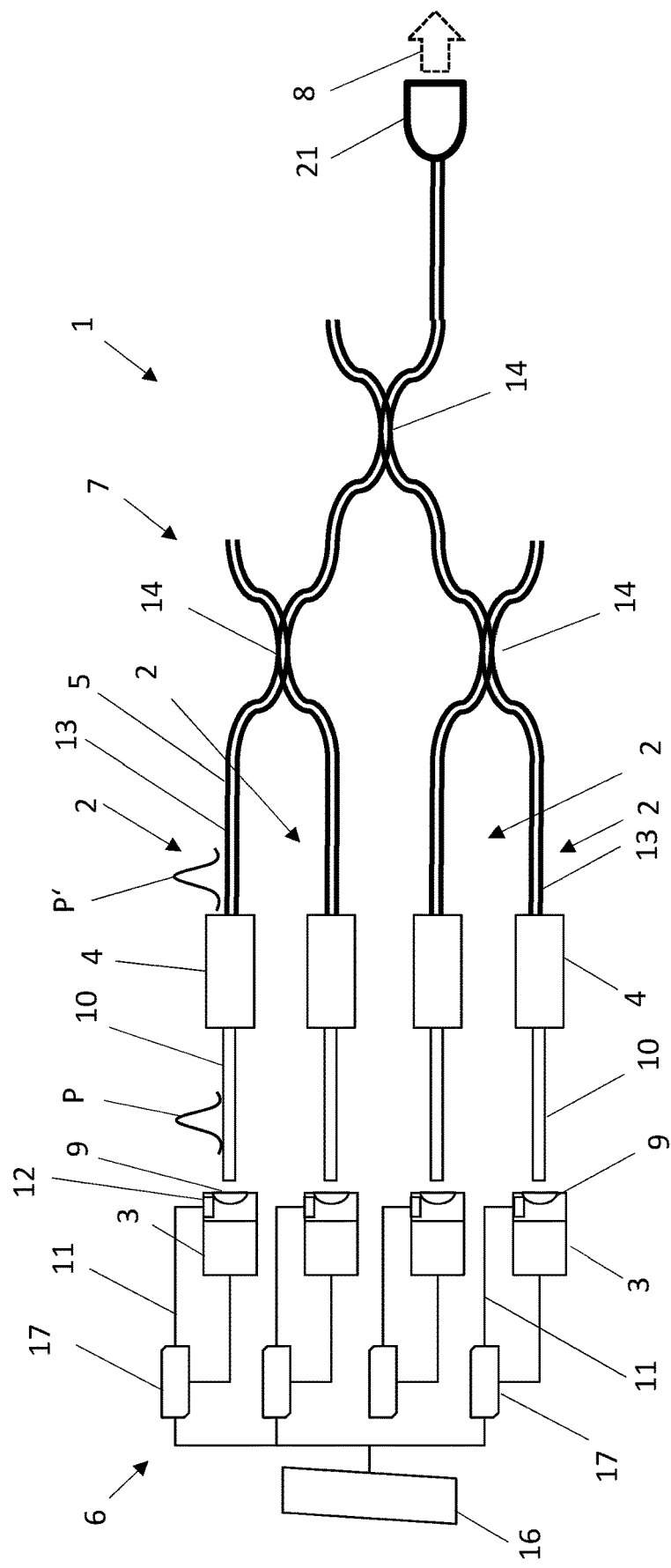
FIG. 3 shows a schematic illustration of a photon source for quantum communication comprising four optical channels based on fiber optics according to a further embodiment of the invention.

Each optical channel 2 comprises a light emitter 3 that is configured to emit optical pulses P. In FIG. 1, only the optical pulses P of the first, upper optical channel 2 is shown. However, the light emitter 3 of each optical channel 2 is configured to emit similar optical pulses P. In this embodiment, the light emitter 3 is a single photon source, which is configured to have a photon emission probability of less than 1 photon per pulse, preferably in the range of 0.1 and 0.5 photons per pulse. In a further embodiment, the light emitter is a "true" single photon source, which emits deterministically a single photon. This true single photon source thus emits at maximum one photon and never emits more than one photon per pulse or cycle. The light emitter 3 is configured as a laser diode, in particular a VCSEL, and configured to emit a spatially single light mode, thus a fundamental Gaussian mode. Although the light emitter 3 is capable of emitting continuous wave light, it is configured here to emit ultrashort optical pulses P. These pulses P generally have a pulse width or pulse duration in the range of 1 ps to 1000 ps. In a preferred embodiment, the pulse width of the optical pulses P is in the range of 50 ps to 200 ps. In an even more preferred embodiment, the pulse width of the emitted optical pulses P is 100 ps. In further embodiments, the light emitter 3 is a quantum dot and configured to emit sequentially entangled photons. In FIGS. 1 to 3, the dashed lines indicate the propagation path of light, i.e., the path of a photon emitted by the light emitter 3.

A phase mask 4 is optically connected to the respective light emitter 3 of the respective optical channel 2. A light beam emitted by the light emitter 3 is incident on the phase mask 4. Phase mask 4 is configured to encode an orbital angular momentum into incident light by a certain spatially dependent phase delay. The phase masks 4 of each optical channel 2 are configured to encode mutually orthogonal orbital angular moment modes to the optical pulses P emitted by the light emitter 3 of each optical channel 2. This is achieved by, e.g., a phase plate including a (high-order) vortex phase distribution. Even though these encoded optical pulses P' are combined and multiplexed, by the mutually orthogonal encoding the single components of the signal can be distinguished and separated by a suitable detector. Examples of such orthogonal modes are, e.g., the Hermite-Gaussian Modes occurring, e.g., in laser resonators, the Laguerre-Gaussian modes inducing a vortex or the LP modes occurring, e.g., in step-index fibers. Each optical channel 2 thus provides an encoded optical output. The phase mask 4 may also be configured to encode high dimensional quantum information (qudits).

For emitting the light, a controller 6 is electrically coupled to each light emitter 3 in each optical channel 2. The controller 6 is configured to control parameters of the optical pulses P. Controller 6 is configured to control at least one of: an emission time, an amplitude, a pulse width, a delay time, an emission frequency, a pulse shape or pulse form of each of the optical pulses P. Controller 6 is further configured to control the photon emission probability of each light emitter 3. In particular, it may be used to run in a decoy-state operation by defining levels of emission probability that might be low enough to substantially avoid two-photon emissions within a clock cycle. This makes a beam-splitting attack of an eavesdropper impossible.

The photon source 1 further comprises combining optics 7 downstream the optical channels 2. The combining optics 7 are configured to combine the encoded optical output 5 of each of the optical channels 2 to form a single encoded optical signal 8 as output of the photon source 1.

FIG. 2 shows a schematic illustration of a photon source 1 for quantum communication comprising four optical channels 2 according to a further embodiment of the invention.

In this embodiment, a free space phase encoder is realized and used to encode the optical pulses P emitted by the light emitter 3. A free-space collimator 19 is used to collimate the light emitted from the light emitter 3 in each optical channel 2. The collimator 19 may be a bifocal length in order to convert a spatially elliptical beam profile into a circular, i.e., nearly single mode beam profile. Instead of two optical channels 2, four optical channels 2 are used. However, it is understood that the number of channels can be higher, to fit the need for a specific encoding. For instance, eight different values of the orbital angular orbital momentum (or any arbitrary superposition of them) can be implemented. Additionally, two or more channels could be turned on together at the same time to realize superposition states, although for maximum security one might desire a separate channel for each superposition state that one needs to generate.

The phase mask 4 and the combining optics 7 comprise free-space optical elements such as a beam combiner 15. The combining optics 7 include three beam combiners 15 and three reflectors 20 in order to combine the four encoded optical outputs 5 of each optical channel 2 into a single encoded optical signal 8. In this embodiment as well, the phase mask 4 is configured to encode high dimensional quantum information (qudits), i.e., a single pulse may contain more than two states (+1, −1), but values with higher number (e.g. 1=3−, ... +2, +3), or more dimensional ((0, 1), (1, 1), etc.) such as Hermite- or Laguerre Gaussian modes.

In this embodiment, the controller 6 comprises a central control unit 16 and, for each optical channel 2 an emitter control circuit 17, wherein each emitter control circuit 17 is configured to control at least one parameter of the light emitter 3 of the respective optical channel 2. The emitter control circuit 17 can control the parameters such as a driving current of the light emitter 3 of the respective optical channel 2 individually.

FIG. 3 shows a schematic illustration of a photon source 1 for quantum communication comprising four optical channels 2 based on fiber optics according to a further embodiment of the invention.

In this embodiment, a waveguide-based or fiber-based encoder is used to impress a different spatial phase pattern to each one of the optical channels 2. These patterns can correspond to different values of the orbital angular momentum. Other implementations (e.g., any orthogonal set of spatial modes) could be used for this purpose.

Each optical channel 2 includes coupling optics 9. The coupling optics 9 comprises micro-lenses that could be aspherical lenses for coupling the emitted optical pulses P into a single mode fiber 10. In each optical channel 2 the fiber is optically connected to the phase mask 4, so that the fiber-coupled light is incident on the phase mask 4. The phase mask 4 in this embodiment is a fiber-based element, such as a silicon-based trench waveguide, and configured to encode the light incident from the single mode fiber 10. From there, the encoded light propagates to the combining optics 7.

In this embodiment, the combining optics 7 is configured as a fiber-based optical setup. In a further embodiment, the coupling optics 7 is provided as an on-chip element. The coupling optics 7 comprises a plurality of optical multimode optical fibers 13 configured to guide light carrying an orbital momentum. The coupling optics further comprises at least one fiber coupler 14 configured to couple light carrying an optical orbital momentum. In this embodiment, three 2×2 fiber couplers 14 have been employed. In further embodiments, 3×1, 4×1 or other fiber couplers 14 may be employed. The at least one fiber coupler 14 is configured to combine at least two encoded optical pulses P' to form a multiplexed encoded optical signal 8.

The multimode optical fibers 13 and the fiber couplers 14 are configured to substantially maintain the encoded optical pulses P'. The multimode optical fibers 13 and the coupler 14 thus may comprise at least one of the following: a multi-mode fiber, a few-mode fiber, a multi-mode core fiber, a few-mode multi-core fiber, a ring core fiber, a vortex fiber, an air-core optical fiber. The plurality of multimode optical fibers 13 is optically connected to an optical channel 2 so that the encoded optical output 5 of each optical channel 2 is coupled into these multimode optical fibers 13 of the combining optics 7.

Each optical channel 2 further includes an electrical feedback circuit 11 comprising at least one photodetector 12. The feedback circuit 11 is configured to detect a part of the light of the emitted optical pulses P and provide a corresponding electrical signal to the controller 6. With this circuit, it is possible to derive the actual photon emission probability of the light emitter. In a further embodiment, the feedback circuit is configured to detect the current, which flows in the light emitter 3. In this way, it is possible to measure the real current driving the light emitter 3. This current could be different from the nominal current value due to, e.g., thermal effects. The measured value is then sent to the controller, which is configured to adjust the driving current in order to obtain the nominal current in the light emitter 3.

As further shown in FIG. 3, the photon source 1 comprises a fiber collimator 21 to output a collimated encoded optical signal 8 into free space. The fiber collimator 21 can comprise lens, e.g., an aspheric or GRIN-lens.

Figure 4:
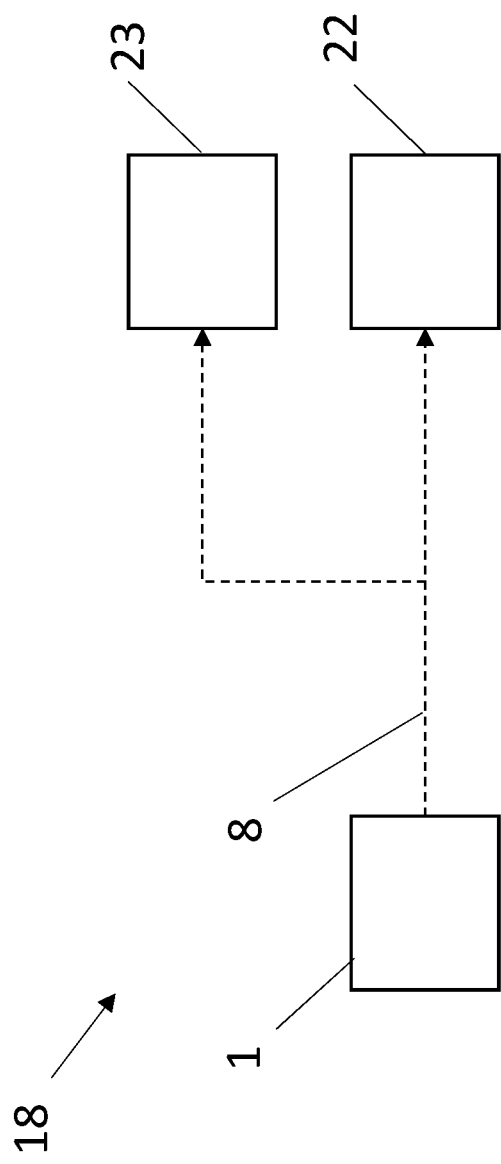
FIG. 4 shows a schematic illustration of an optical quantum communication system comprising the inventive photon source according to a further embodiment of the invention.

FIG. 4 shows a schematic illustration of an optical quantum communication system 18 comprising the inventive photon source 1 according to a further embodiment of the invention.

The photon source 1 produces the encoded optical signal 8 to establish a transmission link to a receiver 22 of the quantum communication system 18. The optical receiver 22 is configured to receive and decode the encoded optical signal 8. Since the photon source 1 is emitting qudits, the receiver 22 is configured to receive and decode the qudits, e.g., by using similar beam-splitting optics as the combining optics 7, including phase masks 4 and detectors instead of light emitter 3. The system thus may use a high-dimensional QKD protocol.

Also shown in FIG. 4 is an eavesdropper 23 that attempts to eavesdrop the encoded optical signal 8 transmitted by the photon source 1, e.g., by a beam-splitting attack. Such an attack should be render unsuccessful by the present communication system 18.

Figure 5:
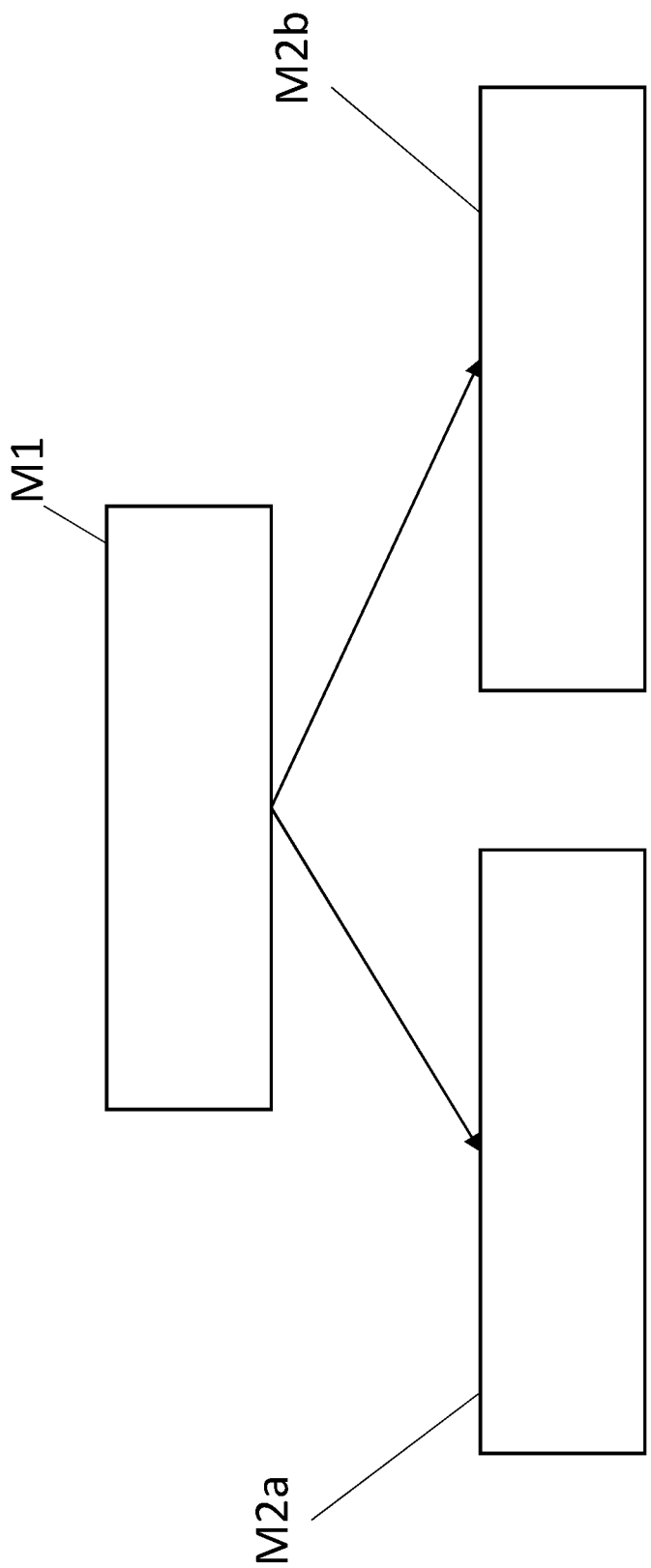
FIG. 5 shows a schematic illustration of a method for quantum communication according to a further embodiment of the invention.

FIG. 5 shows a schematic illustration of a method for quantum communication according to a further embodiment of the invention.

The method for quantum communication comprises the step of providing M1 a photon source 1. The photon source 1 comprises a plurality of optical channels 2 that include at least one light emitter 3. The light emitter 3 is configured to emit optical pulses P. The optical channel 2 further includes a phase mask 4 that is optically connected to the respective light emitter 3. It is configured to encode an orbital angular momentum into incident light coming from the light emitter 3. The light emitter 3 is preferably a spatially single mode light source. On activation of the light emitter 3, the light emitter starts to emit photons so that each optical channel 2 provides encoded optical pulses P' due to passing through the phase mask 4. The encoded optical pulses P' of each of the optical channels 2 are encoded by a mutually orthogonal orbital angular momentum. Each optical channel 2 further comprises combining optics 7 configured to combine the encoded optical pulses P' of each of the optical channels 2 to form a single encoded optical signal 8.

The method further comprises the step of forming M2a the single encoded optical signal 8 by activating simultaneously only one optical channel 2 for each of the encoded optical pulses P' of the encoded optical output 5 of each optical channel 2.

As an alternative to the previous step M2a, the method further comprises the step of forming M2b a multiplexed encoded optical signal as the encoded optical signal 8 by activating simultaneously at least two optical channels 2 and combining the encoded optical pulses P' of each of the activated optical channels 2.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The systems and devices described herein may include a controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST

1 Photon Source
2 Optical channel
3 Light emitter
4 Phase mask
5 Encoded optical output of an optical channel
6 Controller
7 Combining optics
8 Encoded optical signal
9 Coupling optics
10 Single mode fiber
11 Electrical feedback circuit
12 Photodetector
13 Multimode optical fiber
14 Fiber Coupler
15 Beam Combiner
16 Central control unit
17 Emitter control circuit
18 Optical quantum communication system
19 Free-space collimator
20 Reflector
21 Fiber collimator
22 Receiver
23 Eavesdropper
P Optical pulse
P' Encoded optical pulses

The invention claimed is:

1. A photon source for quantum communication, comprising:
a plurality of optical channels, each comprising:
a light emitter configured to emit optical pulses, and
a phase mask optically connected to the respective light emitter and configured to encode an orbital angular momentum into incident light,
wherein each of the phase masks of each optical channel is configured to encode a mutually orthogonal orbital angular momentum to the optical pulses emitted by the light emitter of each optical channel to provide an encoded optical output;
a controller electrically coupled to each light emitter in each optical channel and configured to control parameters of the optical pulses; and
combining optics configured to combine the encoded optical output of each of the optical channels to form a single encoded optical communication signal.

2. The photon source according to claim 1, wherein the light emitter is a single photon source, which is configured to have a photon emission probability of equal or less than 1 photon per pulse.

3. The photon source according to claim 2, wherein the light emitter has a photon emission probability in a range of 0.1 and 0.5 photons per pulse.

4. The photon source according to claim 1, wherein the light emitter is configured as a laser diode and configured to emit a spatially single light mode.

5. The photon source according to claim 1, wherein the light emitter is configured to emit ultrashort optical pulses, having a pulse width in a range of 1 ps to 1000 ps.

6. The photon source according to claim 1, wherein the pulse width is in a range of 50 ps to 200 ps.

7. The photon source according to claim 1, wherein each optical channel includes coupling optics, configured to couple emitted optical pulses into a fiber, wherein for each optical channel the fiber is optically connected to the phase mask.

8. The photon source according to claim 7, wherein the coupling optics comprise an aspherical micro-lens.

9. The photon source according to claim 7, wherein the fiber comprises a single mode fiber.

10. The photon source according to claim 1,
wherein each optical channel includes an electrical feedback circuit comprising at least one photodetector, and
wherein the feedback circuit is configured to detect a part of the light of emitted optical pulses and provide a corresponding electrical signal to the controller.

11. The photon source according to claim 1,
wherein the combining optics is configured as a fiber-based optical setup, and comprises a plurality of multimode optical fibers configured to guide light carrying an orbital momentum and at least one fiber coupler configured to couple light carrying an optical orbital momentum,
wherein both the multimode optical fibers and the at least one fiber coupler are configured to substantially maintain encoded optical pulses,
wherein each of the plurality of multimode optical fibers is optically connected to an optical channel, and
wherein the at least one fiber coupler is configured to combine at least two encoded optical pulses to form a multiplexed encoded optical pulse.

12. The photon source according to claim 11, wherein the multimode optical fibers comprise at least one of the following: a few-mode fiber, a multi-mode core fiber, a few-mode multi-core fiber, a ring core fiber, a vortex fiber, and an air-core optical fiber.

13. The photon source according to claim 1, wherein at least one of the optical channel or the combining optics is configured as an on-chip element.

14. The photon source according to claim 1, wherein at least one of the phase mask or the combining optics comprise free-space optical elements.

15. The photon source according to claim 14, wherein the combining optics comprise a beam combiner.

16. The photon source according to claim 1, wherein the controller is configured to control at least one of: an emission time, an amplitude, a pulse width, a delay time, an emission frequency, and a pulse shape of each of the optical pulses.

17. The photon source according to claim 2, wherein the controller is configured to control the photon emission probability of each light emitter.

18. The photon source according to claim 1,
wherein the controller comprises a central control unit and, for each optical channel an emitter control circuit, and
wherein each emitter control circuit is configured to control at least one parameter of the light emitter of the respective optical channel.

19. An optical quantum communication system comprising a photon source according to claim 1.

20. A method for quantum communication, comprising:
providing a photon source comprising:
a plurality of optical channels comprising at least one light emitter configured to emit optical pulses, and a phase mask optically connected to the respective light emitter and configured to encode an orbital angular momentum into incident light,
wherein on activation of the light emitter each optical channel provides encoded optical pulses, wherein the encoded optical pulses of each of the optical channels are encoded by a mutually orthogonal orbital angular momentum, and
combining optics combining the encoded optical pulses of each of the optical channels to form a single encoded optical signal; and one of
forming the single encoded optical signal by activating simultaneously only one optical channel for each of the encoded optical pulses of the encoded optical output of each optical channel; or
forming a multiplexed encoded optical signal as the single encoded optical signal by activating simultaneously at least two optical channels and combining the encoded optical pulses of each of the activated optical channels.

* * * * *